United States Patent [19]
Hinoki et al.

[11] Patent Number: 5,721,010
[45] Date of Patent: Feb. 24, 1998

[54] METHOD FOR PRODUCTION OF MAGNETIC RECORDING MEDIUM

[75] Inventors: Kiyonori Hinoki; Kiyoto Fukushima; Shigeo Kurose, all of Saku, Japan

[73] Assignee: TDK Corporation, Tokyo, Japan

[21] Appl. No.: 798,098

[22] Filed: Feb. 12, 1997

[30] Foreign Application Priority Data

Feb. 15, 1996 [JP] Japan ................................. 8-052461

[51] Int. Cl.$^6$ ........................................................ B05D 5/12
[52] U.S. Cl. ................... 427/131; 427/209; 427/289; 427/359; 427/369; 427/407.1; 427/419.2
[58] Field of Search .............................. 427/127–132, 427/209, 289, 369, 359, 407.1, 419.2

[56] References Cited

FOREIGN PATENT DOCUMENTS

| | | |
|---|---|---|
| 1-258224 | 10/1989 | Japan . |
| 2-198029 | 8/1990 | Japan . |
| 2-281419 | 11/1990 | Japan . |
| 6-150306 | 5/1994 | Japan . |

OTHER PUBLICATIONS

Patent Abstracts of Japan, vol. 95, No. 10, Nov. 30, 1995, JP-07-176047, Jul. 14, 1995.
Patent Abstracts of Japan, vol. 18, No. 293, (P-1747), Jun. 3, 1994, JP-06-052544, Feb. 25, 1994, and US 5,512,350, Apr. 30, 1996.
Patent Abstracts of Japan, vol. 15, No. 47, (P-1162), Feb. 5, 1991, JP-02-281419, Nov. 19, 1990.

*Primary Examiner*—Bernard Pianalto
*Attorney, Agent, or Firm*—Oblon, Spivak, McClelland, Maier & Neustadt, P.C.

[57] ABSTRACT

This invention produces a magnetic recording medium by applying a magnetic paint for the formation of the magnetic layer and a paint for the formation of the backcoat layer severally to the nonmagnetic support, drying the applied layers of the paints, optionally subjecting the layers to a calendering treatment, performing a curing treatment on the layers thereby adjusting the surface of the backcoat layer to a surface roughness $(Ra)_B$ in the range of 10 nm to 30 nm, and thereafter subjecting the surface of the backcoat layer subsequent to the curing treatment to a polishing treatment by the use of a lapping tape the abrasive layer of which has a surface roughness $(Ra)_L$ in the range of 150 nm to 550 nm. In a preferred embodiment of this invention, the Mohs hardness of the abrasive grains contained in the abrasive layer is set within a prescribed range and the conditions of the curing treatment are fixed within prescribed ranges. The magnetic recording medium produced by this invention, therefore, never suffers the surface of the backcoat layer to sustain a scratch, provides thorough protection against the occurrence of instantaneous clogging and DO, and exhibits a veritably excellent running property (evinced particularly by the realization of low torque against the POM guide).

4 Claims, 3 Drawing Sheets

METHOD FOR PRODUCTION OF MAGNETIC RECORDING MEDIUM

BACKGROUND OF THE INVENTION

1. Field of the Invention

This invention relates to a method for the production of a magnetic recording medium, which comprises a step of subjecting a backcoat layer subsequent to a curing treatment to a polishing treatment by the use of to a lapping tape.

2. Description of the Prior Art

Concerning the magnetic recording medium which is provided on a nonmagnetic support with a magnetic layer, numerous proposals have been heretofore made to the effect that a backcoat layer containing a pigment such as carbon black is formed on the reverse surface of the nonmagnetic support (opposite the surface basing the magnetic layer) for the purpose of improving the magnetic recording medium in the running property and these proposals have been turn to practical use. Meanwhile, a cleaning method for polishing the surface of the magnetic layer has been proposed as a means to preclude the occurrence of dropout (DO) due to defects such as the inclusion of extraneous matter in the magnetic layer and this method has been turn to practical use.

In recent years, the magnetic tape has come to require higher density, lower cost, and higher reliability. These requirements, particularly the running property of the magnetic tape in the video cassette provided with a guide made of such resin as polyacetal (POM) which promises a reduction in cost, are not fully satisfied by such conventional devices as the polishing treatment performed on the magnetic layer and the addition of a backcoat layer. The demand on the improvement of the running property (reliability) is particularly strong. To satisfy these requirements, the following techniques have been proposed concerning the polishing of the backcoat layer.

(1) JP-A-06-150306 discloses a device for treating the surface of a magnetic tape by causing an abrasive tape to be pressed into sliding contact with the surface of the magnetic tape by means of a backup roll thereby giving the surface necessary treatment, wherein the abrasive tape is formed of a porous material provided with an abrasive powder and the device is provided with a dusting mechanism adapted to aspirate the dirt caught on the abrasive tape.

(2) JP-B-02-198029 discloses a method for polishing a magnetic recording medium by preparing a polishing member comprising a support and an abrasive layer formed on the support and containing numerous holes perforating the support and the abrasive layer, causing the polishing member and the magnetic recording medium whose surface in need of a polish is held in contact with the abrasive layer of the polishing member to be wound around the curved surface part of a porous guide post, and causing the abrasive member and the magnetic recording medium to run while kept in mutual contact thereby implementing necessary polishing.

(3) JP-A-01-258224 discloses a method for polishing the surface of a magnetic recording medium with an abrasive roll in motion or with an abrasive tape in conveyance in a fixed direction, wherein the abrasive roll or the abrasive tape has surface roughness (Ra) of not less than 600 nm.

(4) JP-A-02-281419 discloses a method which comprises applying a magnetic layer on one of the opposite surfaces of a support, drying the applied magnetic layer, then giving the dried magnetic layer a calendering treatment, thereafter applying a back layer on the other surface of the support, polishing the surface of the back layer, winding up the superposed layers on a roll, and then performing a thermo-treatment (curing treatment) on the completed tape.

The methods of (1) through (4) mentioned above, however, have not paid a full consideration to the surface roughness $(Ra)_B$ of the surface of the backcoat layer subjected to the polishing treatment and to the surface roughness $(Ra)_L$ of the abrasive layer which plays the role of giving necessary polishing. Thus, it is not safe to conclude that they offer a thoroughgoing measure to protect the surface of the backcoat layer against scratch, instantaneous clogging, and DO and improve the magnetic recording medium in the running property (particularly the improvement of torque against the POM guide).

This invention has been originated in recognition of the true state of prior art mentioned above. An object of this invention is to provide a method for the production of a magnetic recording medium which never suffers the surface of a backcoat layer to sustain a scratch, provides thorough protection against the occurrence of instantaneous clogging and DO, and exhibits a veritably excellent running property (evinced particularly by the realization of low torque against the POM guide).

SUMMARY OF THE INVENTION

To accomplish the object described above, this invention provides a method for the production of a magnetic recording medium provided on one of the opposite surfaces of a nonmagnetic support with a magnetic layer and on the other surface thereof with a backcoat layer, which method comprises applying a magnetic paint for the formation of the magnetic layer and a paint for the formation of the backcoat layer severally to the nonmagnetic support, drying the applied layers of the paints, optionally subjecting the layers to a calendering treatment, performing a curing treatment on the layers thereby adjusting the surface of the backcoat layer to a surface roughness $(Ra)_B$ in the range of 10 nm to 30 nm, and thereafter subjecting the surface of the backcoat layer subsequent to the curing treatment to a polishing treatment by the use of a lapping tape the abrasive layer of which has a surface roughness $(Ra)_L$ in the range of 150 nm to 550 nm.

In this invention, the surface roughness $(Ra)_B$ of the surface of the backcoat layer subjected to a polishing treatment and the surface roughness $(Ra)_L$ of the abrasive layer which plays the role of providing necessary polishing are defined within respectively prescribed ranges as mentioned above. This invention, therefore, allows production of a heretofore unattainable magnetic recording medium, i.e. a magnetic recording medium which never suffers the surface of a backcoat layer to sustain a scratch, provides thorough protection against the occurrence of instantaneous clogging and DO, and exhibits a veritably excellent running property (evinced particularly by the realization of low torque against the POM guide).

As preferred embodiments for the accomplishment of the object of this invention, (1) the fact that the abrasive grains contained in the abrasive layer of the lapping tape for giving the polishing treatment to the surface of the backcoat layer have Mohs hardness of not less than 9.0, (2) the fact that the polishing treatment given to the surface of the backcoat layer is carried out subsequently to a thermally curing treatment performed under the conditions of 50° C. to 80° C. and 12 to 48 hours, (3) the fact that the surface of the backcoat layer is subjected to the polishing treatment and, at the same time, the surface of the magnetic layer is subjected to the polishing treatment, and (4) the fact that after the surface of the backcoat layer has been subjected to the polishing treatment, the polished surface is cleaned (wiped) may be cited. The outcome of the fulfillment of the object of this invention gains all the more in conspicuousness when these embodiments are satisfied.

DETAILED DESCRIPTION OF THE INVENTION

Figure 1:
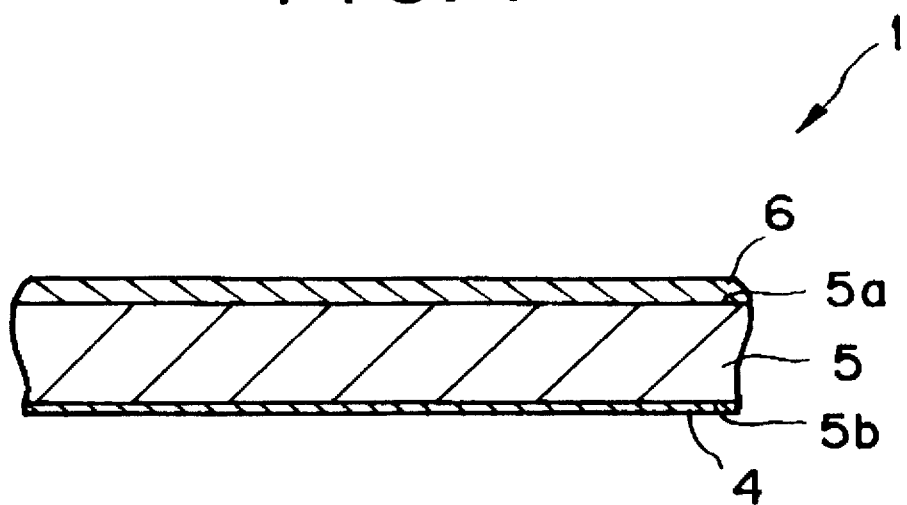
FIG. 1 is a cross section schematically illustrating one example of the magnetic recording medium which is aimed at by the method of production of this invention.

Now, the mode of embodying this invention will be described in detail below. One example of the magnetic recording medium 1 which the present invention aims to produce is illustrated in FIG. 1. The magnetic recording medium 1, as illustrated in the diagram, comprises a magnetic layer 6 formed on one 5a of the opposite surfaces of a nonmagnetic support 5 and a backcoat layer 4 formed on the other surface 5b of the nonmagnetic support 5. One example of the production process as an aid in the description of the method for producing this magnetic recording medium 1 is illustrated in FIG. 2.

Figure 2:
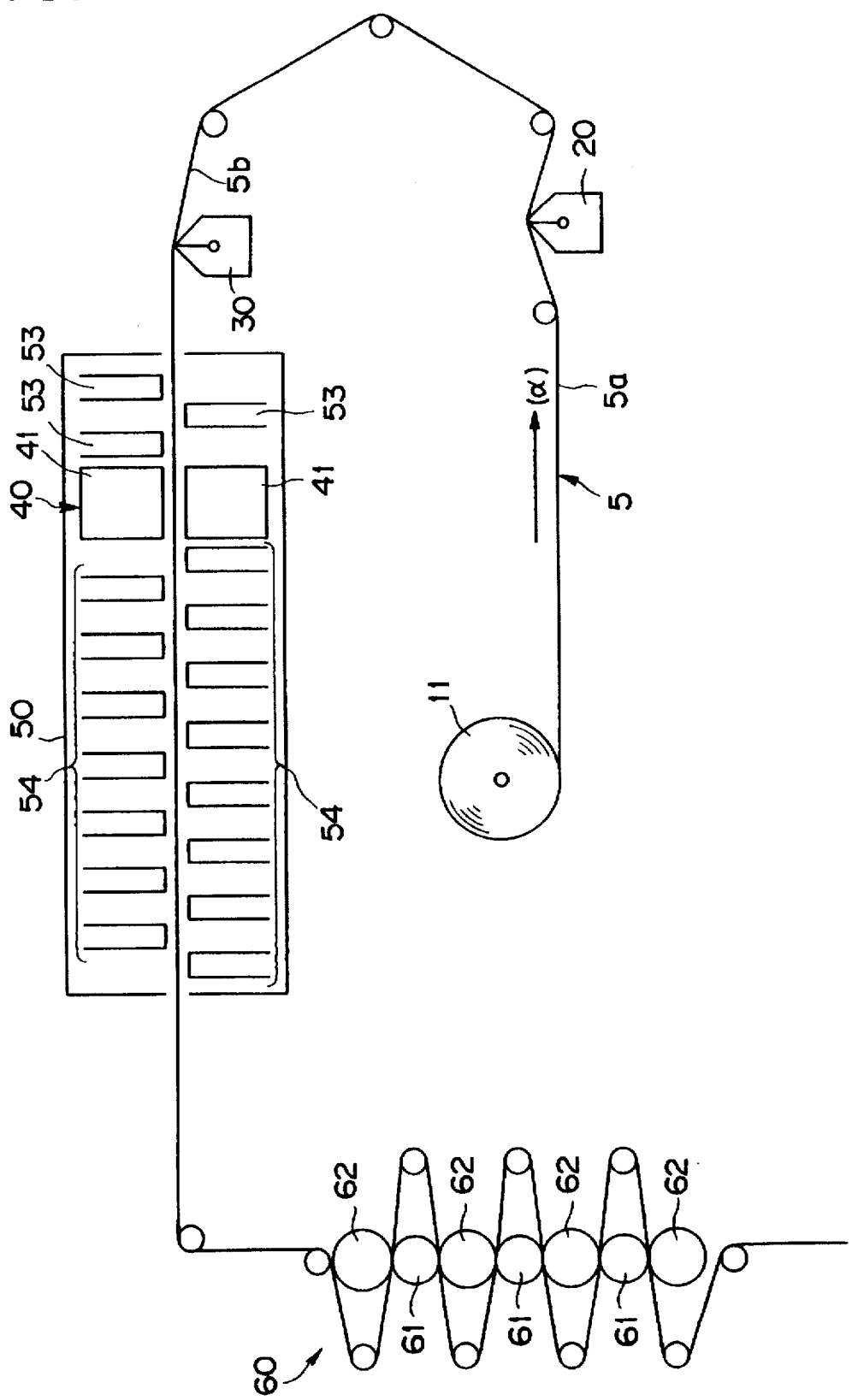
FIG. 2 is a process flow diagram schematically illustrating one example (to a point halfway along the entire course) of the method of production of this invention.

With reference to FIG. 2, an unwinding device provided with an unwinding roll 11 on which the nonmagnetic support 5 is wound is positioned on the most upstream side. Toward the downstream side from this unwinding roll 11, a device for applying a magnetic paint (such as, for example, an extrusion nozzle 20), a device for applying a paint for the formation of a backcoat layer (such as, for example, an extrusion nozzle 30), an orienting device 40, a drying device 50, a calendering device 60, and a winding device (not shown) are sequentially disposed as main components of the equipment.

The method of production of this invention, as illustrated in FIG. 2, has the first step of applying a magnetic paint for the formation of the magnetic layer on one 5a of the opposite surfaces of the nonmagnetic support 5 in continuous motion (in the direction of an arrow mark α) by the use of the coating device (such as, for example, the extrusion nozzle 20).

Generally, the surface of the nonmagnetic support 5 is more often than not treated, prior to the application of the paint for the purpose of cleaning and reducing the surface to use, by various known means such as, for example, wet cleaning which uses water or a solvent, dry cleaning which uses non-woven fabric or a woven fabric of very fine fibers as a wiper, and non-contact cleaning which uses compressed air, vacuum, or ionized air. Further, the surface of the nonmagnetic support 5 is often given various known non-contact surface treatments resorting to corona discharge, exposure to ultraviolet ray, or exposure to electron beam for the purpose of exalting the fastness of adhesion of the paint and the nonmagnetic support 5 and improving the surface of the applied layer of the paint. There are times when the application of an aqueous undercoating agent, an emulsion-based undercoating agent, or a solvent-based undercoating agent is practiced either alone or in combination with the surface treatment mentioned above for the purpose of exalting the fastness of adhesion mentioned above.

The application of the magnetic paint mentioned above generally may be followed by various treatments such as smoothing the surface of a wet film of the magnetic paint deposited on the nonmagnetic support and regulating the applied layer of the paint. The smoothing treatment can be effected by various known methods such as the contact of a film or a bar made of a resinous substance, metallic substance, or ceramic substance and the vibration caused by the magnetic field of a permanent magnet or an electromagnet or by the ultrasonic wave, for example. These methods may be used either singly or in combination, depending on the quality of the film required to be produced.

Immediately after the application of the magnetic paint performed as described above, the paint for the formation of the backcoat layer is applied on the other surface 5b of the nonmagnetic support 5 in continuous motion by the use of the coating device (such as, for example, the extrusion nozzle 30).

In the method of application illustrated in FIG. 2, the magnetic paint and the paint for the formation of the backcoat layer are applied substantially simultaneously to the opposite surfaces of the support. As respects the coating devices to be employed in this case, the coating device disposed on the upstream side may be a gravure coater, a reverse roll coater, or an extrusion nozzle and the coating device on the downstream side must be an extrusion nozzle. When the paints are applied perfectly simultaneously to the opposite surfaces of the nonmagnetic support (as when the magnetic paint and the paint for the formation of the backcoat layer are applied simultaneously to the opposite surfaces), the two applying devices to be used must be both extrusion nozzles.

After the magnetic paint for the formation of the magnetic layer and the paint for the formation of the backcoat layer have been severally applied on the nonmagnetic support 5 as described above and before the magnetic paint already forming the magnetic layer dries, orienting magnets 41, 41 of the orienting device are set generating a magnetic field which gives an orienting treatment to the magnetic layer.

The orienting treatment by means of the orienting magnets 41, 41 may be performed after the applied layers of the paints have been preparatorily dried with hot air blowing nozzles 53 disposed in front of the orienting magnets 41, 41 in the drying oven as illustrated in FIG. 2. The reference numeral 54 denotes a plurality of hot air blowing nozzles which are disposed on the downstream side of the orienting magnets 41, 41. The orienting magnets do not need to be limited to one pair as illustrated in the diagram but may be disposed at a multiplicity of stages within the drying oven. It is permissible to dispose the orienting magnets of the forward stage (not shown) between the extrusion nozzle 30 and the entrance to the drying oven and to dispose the orienting magnets of the rearward stage inside the drying oven.

As respects the orienting treatment which is performed for the purpose of orienting the magnetic particles contained in the magnetic layer, the direction of orientation may be parallel, perpendicular, or oblique to the running direction of the medium. Further, field generating means such as ferrite magnet, rare earth magnet, and other permanent magnets, electromagnets, and solenoids are available for the purpose of fixing the orientation in a prescribed direction. A plurality of such magnetic field generating means may be used in concert. It is further allowable to provide a proper drying step prior to the step of orientation or to perform the drying treatment simultaneously with the orienting treatment for the purpose of enabling the orientation property to be maximized subsequently to the drying treatment.

After the orienting treatment has been carried out as described above, the applied layers of the paints are dried by the drying device 50 (drying oven). In the case of the drying device 50 illustrated in FIG. 2, the applied layers are dried with the hot air blown out of the hot air blowing nozzles 53, 54. Alternatively, the applied layers may be dried and fixed by known drying and vaporizing means such as far-infrared ray, an electric heater, or a vacuum device or by known curing devices such as an ultraviolet lamp or a radiation exposure device. The drying temperature is properly selected in the range of from room temperature to the neighborhood of 300° C., depending on the heat-resisting property of the nonmagnetic support and the kind and the concentration of a solvent to be used therein. The interior of the drying oven may be furnished with a temperature gradient. The gaseous atmosphere inside the drying oven may be formed of ordinary air or an inert gas. Since the drying, when effected with an ultraviolet amp or a radiation device, entrains a curing reaction, it is proper to adopt some other drying means as far as permissible in due consideration of the subsequent steps of the process. When the applied layers are exposed to the ultraviolet ray or the radiation while they still contain the solvent, they possibly emit fire or smoke. Again in this case, it is appropriate to adopt some other drying means as far as permissible.

The applied films (the magnetic layer and the backcoat layer) which have undergone the orienting treatment and the drying treatment as described above are subsequently given a calendering treatment by the calendering device 60. Though the calendering operation is carried out continuously in line in the present mode of embodiment, it may be performed off line as a matter of course. When the calendering operation is carried out in line while the magnetic layer and the backcoat layer are duly deposited, the susceptibility of the magnetic layer to the surface treatment is improved prominently and the characteristics thereof such as the electromagnetic conversion property are also enhanced. Further when the calendering treatment is performed continuously in line, the loss of the already deposited paints which has been heretofore incurred when the magnetic layer and the backcoat layer are calendered separately of each other can be reduced.

The calendering device 60 which implements the calendering operation is provided, as illustrated in FIG. 2, with a plurality of calender rolls 61, 62 which are severally arrayed in a row. The nonmagnetic support having the magnetic layer formed thereon is passed between the calender rolls as simultaneously pressed and heated. In the construction illustrated in FIG. 2, the calender rolls 61 are so disposed as to contact the obverse surface of the magnetic layer and the calender rolls 62 are so disposed as to contact the reverse surface of the nonmagnetic support (the surface basing the backcoat layer). The calender rolls 61 on the side for contact with the obverse surface of the magnetic layer are generally metallic rolls and the calender rolls 62 on the side for contact with the reverse surface of the nonmagnetic support may be resinous rolls or metallic rolls, whichever better suit the occasion. As the resinous rolls, the rolls made of such a heat-resistant plastic substance as epoxy, polyester, nylon, polyimide, or polyimideamide (which may incorporate therein carbon, metal, or some other inorganic compound) are advantageously used.

These calender rolls 61, 62 are generally used as combined in about three to seven stages (FIG. 2 depicts seven stages of rolls). The calendering temperature is appropriately not less than 70° C. preferably not less than 80° C. The linear pressure to be used for the nipping action produced between the rolls is appropriately not less than 200 kg/cm, preferably 300 kg/cm. The calendering speed is generally in the range of 20 m/minute to 700 m/minute.

The calendering treatment performed as described above is followed by the curing treatment which is intended to promote the curing of the magnetic layer and the backcoat layer. The curing treatment of the backcoat layer is carried out without fail for the purpose of enabling the subsequent polishing treatment (which will be described specifically herein below) to be implemented infallibly and thoroughly.

As concrete examples of the curing treatment for curing the applied films, the thermally curing treatment which generally heats the tape as wound up in a roll and the curing treatment which generally heats the tape by exposure to an electron beam or an ultraviolet ray before the tape is wound up in a roll may be cited. The thermally curing treatment which heats the tape as wound up in a roll is carried out at a temperature in the range of 50° to 80° C. for a period in the range of 12 to 48 hours. If the temperature of this treatment is less than 50° C., the treatment will be at a disadvantage in failing to promote the curing sufficiently. Conversely, if this temperature exceeds 80° C., since it exceeds the glass transition temperatures, Tg, of the support and the binder forming the medium, the treatment will be at a disadvantage in suffering the magnetic layer and the backcoat layer to stick to each other (the so-called blocking). If the time of the treatment is not sufficient, the curing of the applied films will not be fully promoted.

When the backcoat layer is polished while the applied film of the backcoat layer is not fully cured, the effect of this invention will be possibly reduced. The effect obtained in this backcoat layer may well be rated as sufficient as compared with the backcoat which is not cured at all.

The curing treatment by the exposure to an electron beam is advantageously implemented by using an electron accelerator having an acceleration voltage in the range of 100 kV to 750 kV, preferably 150 kV to 300 kV and operating this electron accelerator with an absorbed dose kept in the range of 20 to 200 kilograys. In the case of the curing treatment which resorts to the exposure to an electron beam, it is important that this exposure be carried out in the atmosphere of such an inert gas as $N_2$, He, or $CO_2$ having an oxygen content of not more than 1%. The condition precludes the possibility that the $O_3$ generated by the electron beam used for the exposure will seize radicals.

When the curing treatment is carried out by the exposure to an ultraviolet ray, it suffices to allow the binder containing an electron beam-curing resin to incorporate additionally therein a known photopolymerization sensitizing agent prior to the exposure to the ultraviolet ray. Appropriately, the exposure to the ultraviolet ray is implemented by the use of an ultraviolet lamp such as a xenon discharge tube or a hydrogen discharge tube.

At the end of the curing treatment performed as described above, the surface of the backcoat layer of the magnetic recording medium appropriately has surface roughness $(Ra)_B$ in the range of 10 nm to 30 nm, preferably 13 to 25 nm (the suffix B in $(Ra)_B$ denotes the backcoat layer). If the magnitude of the surface roughness exceeds 30 nm, since the surface roughness prior to the polishing is large, the specific polishing treatment to be described herein below will bring about no appreciable change in the rises and falls of the surface roughness and will not improve very much the magnitude of the torque in the POM guide. Further, the excess surface roughness will result in increasing the amount of the dust emanating from the polishing treatment and, when the dust escapes being thoroughly wiped out, suffering this dust to induce such adverse effects as the occurrence of instantaneous clogging and the increase of dropout (DO). Conversely, if the magnitude of surface roughness is less than 10 nm, the problem arises that the protuberances on the backcoat layer will be abraded more than necessary and the endurance friction will be inevitably increased. Further, the insufficient surface roughness will result in suffering the polishing action to inflict a scratch on the surface of the backcoat layer and encourage an increase of DO by the scratch.

The formation of the backcoat layer possessing surface roughness $(Ra)_B$ in the range specified above only requires proper adjustment of the particle diameter of carbon black particles contained in the backcoat layer 4, the surface properties of the nonmagnetic support 5, the condition of application of the paint, the condition of drying operation, and the condition of the calendering operation.

Then the green magnetic recording medium which is provided with the backcoat layer 4 of the quality described above is subsequently cut with a slitter and reduced to the prescribed shape of a tape and, while it is being cut or after it has been cut, the surface of the backcoat layer is subjected to the polishing treatment. The polishing treatment given to the surface of the backcoat layer 4 is intended to grind and remove such protuberances and extraneous deposits as are produced during the formation of the backcoat layer in the process of producing the magnetic recording medium and consequently improve the magnetic recording medium in running property and DO. It has been confirmed by the present inventor that when the backcoat layer formed in the magnetic recording medium prior to the polishing treatment fails to satisfy certain surface conditions, the polishing treatment rather brings about adverse effects on the backcoat layer.

Figure 3:
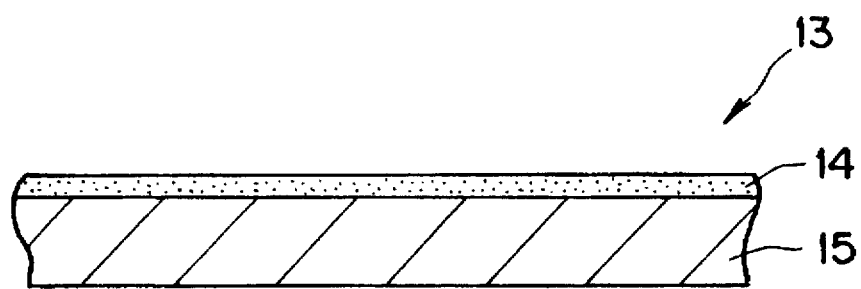
FIG. 3 is a cross section schematically illustrating one example of the lapping tape to be used in the method of production of this invention.

Now, the concrete method for effecting this polishing treatment will be described below with reference to FIG. 3 and FIG. 4. FIG. 3 is a cross section of the so-called lapping tape. A lapping tape 13 is provided on a flexible support 15 with an abrasive layer 14. The surface roughness $(Ra)_L$ of the abrasive layer 14 is fixed in the range of 150 nm to 550 nm (the suffix L in $(Ra)_L$ denotes the lapping tape). If the magnitude of this surface roughness exceeds 550 nm, since the surface roughness of the abrasive layer 14 is unduly large, the abrasive layer 14 will often inflict a scratch on the surface of the backcoat layer 4 and eventually aggravate DO. Conversely, if this magnitude is less than 150 nm, the insufficient surface roughness coupled with the surface roughness $(Ra)_B$ of the backcoat layer will prevent the lapping tape from manifesting a fully satisfactory abrasive ability and improving the torque and DO very much. By adjusting the surface roughness $(Ra)_L$ of the abrasive layer 14 in the range of 150 nm to 550 nm in concert with the surface roughness $(Ra)_B$ of the backcoat layer mentioned above, therefore, the magnetic recording medium to be produced is enabled to allay DO and instantaneous clogging and excel in the running property (particularly the torque in the POM guide) without suffering the backcoat layer 4 to sustain a scratch on the surface.

The flexible support 15 of this lapping tape 13 generally uses a polyester for the raw material therefor. The thickness of the flexible support 15 generally is in the approximate range of 10 to 50 µm. The abrasive layer 14 is formed by using abrasive grains and a binder as main components thereof. For the abrasive grains, grains of such a substance as $\alpha\text{-}Al_2O_3$, $Cr_2O_3$, or SiC which has Mohs hardness of not less than 9 are appropriately used. If the abrasive grains have Mohs hardness of less than 9, since the abrading effect is not sufficient, the effect of this invention will not be easily manifested. The thickness of the abrasive layer 14 is generally in the approximate range of 3 to 8 µm.

Figure 4:
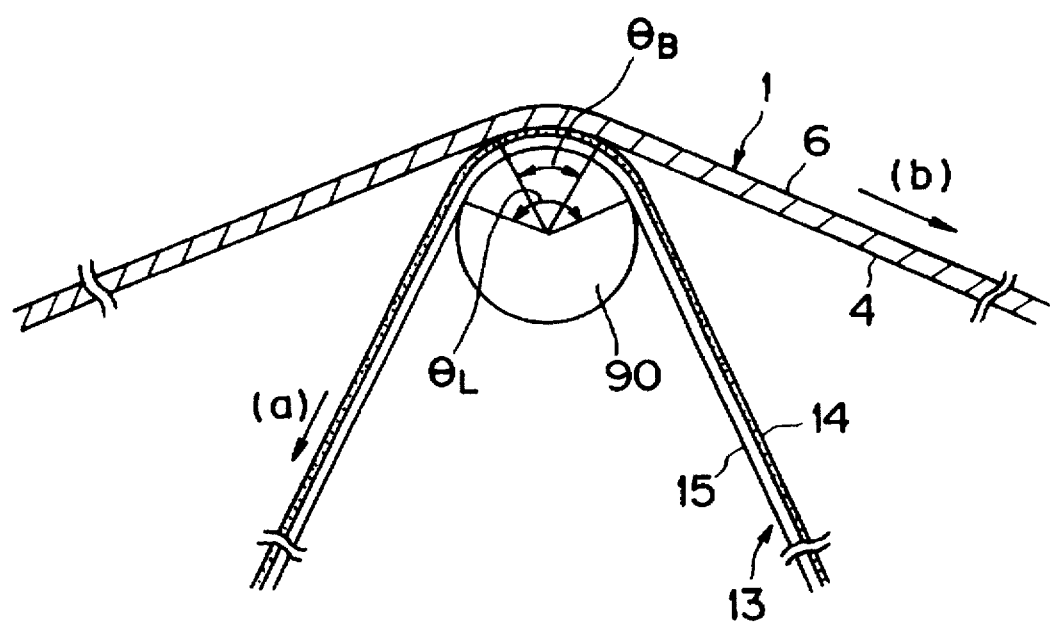
FIG. 4 is a cross section as an aid in the description of the state of polishing treatment in this invention.

The specific state of polishing is depicted in FIG. 4. As illustrated in the diagram, the lapping tape 13 is run on a rodlike supporting pin 90 (having a cylindrical cross section as illustrated) in the direction of an arrow (a) with the rear surface (the flexible support 15) thereof held in contact with the supporting pin at an angle of contact of $\theta_L$ and the magnetic recording medium 1 is run on the lapping tape 13 in the direction of an arrow (b) with the backcoat layer 4 held in contact with the lapping tape 13 at an angle of contact of $\theta_B$. The polishing treatment, therefore, is implemented by causing the abrasive layer 14 surface of the lapping tape 13 to run while keeping counter-flow contact with the backcoat layer 4 of the magnetic recording medium 1. The fact that the running direction (a) of the lapping tape 13 is the reciprocal of the running direction (b) of the magnetic recording medium 1 as illustrated in the diagram proves advantageous from the viewpoint of the efficiency of operation. Nevertheless, the running direction of the lapping tape 13 may be the same as that of the magnetic recording medium 1. The essential point is that the relative speed between the lapping tape 13 and the magnetic recording medium 1 both in motion should fall in a prescribed range.

The pressure of contact between the backcoat layer 4 and the lapping tape 13 must be amply large for improving the DO, the instantaneous clogging, and the torque against the POM guide and for preventing the air from being engulfed therebetween when the contact running thereof gains in speed. The polishing treatment, therefore, can be carried out uniformly and efficiently by decreasing the diameter of the supporting pin 90 and reducing the contact area between the backcoat layer 4 and the lapping tape 13.

The diameter of the supporting pin 90, therefore, is required to be not more than 5 mm, preferably to be in the range of 1 to 3 mm.

The relation between the angle of contact $\theta_L$ mentioned above and the angle of contact $\theta_B$ is always $\theta_B < \theta_L$ and the angle of contact angle $\theta_L$ is in the range of 10° to 120°, preferably 20° to 110°. The angle of contact $\theta_B$ is in the range of 10° to 90°, preferably 20° to 80°. If the angle of contact $\theta_B$ or $\theta_L$ deviates from the above range, namely if the contact area is unduly large, the effect of the polishing treatment will be lowered and the improvement of the torque against the POM will not be attained. If the contact area is unduly small, the polishing treatment will proceed excessively and do the harm of inflicting scratch on the surface of the backcoat layer.

If the lapping tape 13 is stopped or compelled to run intermittently during the polishing treatment, since the surface quality of the lapping tape 13 varies along the course of time of the polishing treatment, uneven polishing (mixture of parts of excessive polishing and parts of insufficient polishing) will occur in the direction of length of the surface of the backcoat layer and the effect of this invention manifested in decreasing the occurrence of scratches on the surface of the backcoat layer and improving the torque against the POM guide will be possibly deprived of uniformity.

To be specific, the running speed of the lapping tape 13 is in the range of 20 to 150 mm/min, preferably 50 to 100 mm/min and the tension produced in the lapping tape 13 is in the range of 20 to 300 g/(½ inch), preferably 30 to 200 g/(½ inch). The running speed of the magnetic recording medium is in the range of 100 to 700 m/min, preferably 200 to 600 m/min and the tension produced in the magnetic recording medium 1 is in the range of 100 to 500 g/(½ inch), preferably 150 to 400 g/(½ inch).

The number of cycles of the polishing treatment is properly in the range of 1 to 4. Properly, the smoothness of the abrading layer 14 of the lapping tape 13 is increased within the range mentioned above in proportion as the number of cycles of the polishing treatment increases. For the purpose of increasing the number of cycles of the polishing treatment, it suffices to array serially in line a plurality (generally four as mentioned above) of the step of treatment provided with the supporting pin 90 illustrated in FIG. 4.

After the surface of the backcoat layer 4 has been polished by the lapping tape 13 as described above, it is appropriately subjected to the wiping treatment. By performing the wiping treatment after the surface of the backcoat layer has been polished, the dust of grinding produced during the polishing treatment, when suffered to adhere to the backcoat layer 4, can be wiped out. As a result, the DO and the instantaneous clogging will be further improved.

As concrete examples of the wiping material, the product of Japan Vilene marketed under product code of "#4000CR", the product of Asah Kasei Kogyo marketed under trademark designation of "Benriize TS507", and the product of Toray marketed under trademark designation of "Mirakureeshon Tape #52002TR" may be cited.

Incidentally, in the method of production illustrated in FIG. 2 above, the magnetic paint is applied first and the paint for the formation of the backcoat layer is subsequently applied. This order of the application of the two paints may be reversed. Otherwise, the two paints may be applied at the same time. The method for the formation of the magnetic layer and the backcoat layer prior to the polishing treatment is not particularly limited. Any of the various known methods may be adopted. The polishing treatment contemplated by this invention may be performed, for example, subsequently to the procedure which comprises applying the magnetic paint, drying the applied film, calendering the dried film, then applying the paint for the formation of the backcoat layer, drying the applied film, giving a calendering treatment to the dried film, winding up the tape provisionally, and subjecting the applied films to the curing treatment.

The surface roughness, specifically the 10-point surface roughness (Rz), of the surface of the backcoat layer of the magnetic recording medium which has undergone the polishing treatment mentioned above appropriately is in the range of 80 to 210 nm. If this magnitude is less than 80 nm, the insufficient surface roughness will result in increasing the friction in the endurance run. Conversely, if this magnitude exceeds 210 nm, the excessive surface roughness will do the harm of adding to the torque against the POM guide.

Now, the magnetic paint for the formation of the magnetic layer and the paint for the formation of the backcoat layer to be used in this invention will be described below.

The magnetic paint contains a magnetic powder, a binder, etc.

The magnetic powder is not particularly limited but may be properly selected from among the known magnetic powders such as, for example, fine oxide powders of $\gamma$-$Fe_2O_3$, Co-containing $\gamma$-$Fe_2O_3$, $Fe_3O_4$, Co-containing $Fe_3O_4$, $CrO_2$, barium ferrite, and strontium ferrite and fine powders of Fe, Co, and Ni or alloys thereof, depending on the purpose of use. The shape of the particles of the magnetic powder is not particularly limited but may be any of the commonly known shapes such as those resembling needles, spindles, granules, and plates. The average major diameter and the average axial ratio are not particularly limited but are only required to fall in the generally accepted ranges.

The binder may be a thermoplastic resin, a thermosetting resin, a reactive resin, or any of the mixtures thereof, whichever may suit the occasion best. As the resinous component for the binder, it is advantageous to use the combination of a vinyl chloride-based resin with a polyurethane-based resin. The mixing ratio by weight of the vinyl chloride-based resin and the polyurethane-based resin is particularly appropriate in the range of 40:60 to 80:20. The content of the binder in the magnetic powder properly is in the range of 5 to 40 parts by weight, preferably 10 to 30 parts by weight, based on 100 parts by weight of the magnetic powder.

The magnetic paint generally contains a cross-linking agent. Various polyisocyanates and diisocyanates can be used for the cross-linking agent. It is particularly proper to use at least one member selected from the group consisting of tolylene diisocyanate, hexamethylene diisocyanate, and methylene diisocyanate. Particularly advantageously, this cross-linking agent is used in the form of a cross-linking agent so modified as to possess a plurality of hydroxyl groups such as of trimethylol propane or in the form of an isocyanurate type cross-linking agent combining three molecules of a diisocyanate compound. The content of this cross-linking agent in the binder is properly in the range of 10 to 40 parts by weight, based on 100 parts by weight of the binder.

The magnetic layer appropriately incorporates therein minute inorganic particles such as of $\alpha$-$Al_2O_3$, $Cr_2O_3$, SiC, $TiO_2$, or $\alpha$-$Fe_2O_3$ for the purpose of making an addition to the mechanical strength thereof. It may further incorporate therein an antistatic agent such as carbon black, a lubricant such as fatty acid or a fatty acid ester, or a dispersant.

The magnetic paint for the format on of the magnetic layer is prepared by adding an organic solvent to the components mentioned above. The organic solvent to be used herein is not particularly limited but may be selected from among various solvents including ketone type solvents such as methyl-ethyl ketone, methylisobutyl ketone, and cyclohexanone and aromatic solvents such as toluene. One member or a mixture of two or more members selected properly from the group mentioned above can be used. The amount of the organic solvent to be added is appropriately in the approximate range of 100 to 900 parts by weight, based on 100 parts by weight of the total amount of solids (magnetic powder and various inorganic particles) and the binder.

The process for the production of the magnetic paint at least comprises a kneading step and a dispersing step. Optionally, it may add a mixing step, a viscosity adjusting step, and a filtering step before or after the steps mentioned above.

The thickness of the magnetic layer which is obtained by applying the magnetic paint for the formation of the magnetic layer to the support and then reducing the applied layer of the paint to a required quality is fixed in the range of 0.1 to 5 µm.

Now, the paint for the formation of the backcoat layer will be described below.

The backcoat layer is formed essentially for the purpose of improving the magnetic recording medium in the running stability and vesting this medium with enhanced electroconductivity and light-intercepting property. The paint for the formation of the backcoat layer, therefore, is properly required to contain carbon black. The content of carbon black is such that the backcoat layer to be formed may ultimately contain carbon black in a concentration in the range of 30 to 80% by weight. If the carbon black content deviates from this range, namely if the content is either less than 30% by weight or exceeds 80% by weight, the surface roughness $(Ra)_B$ of the backcoat layer will not be easily set in the range of 10 to 30 nm. Though the carbon black may be any of the species in common use, it is properly required to have an average particle diameter in the range of 10 to 400 nm. If the average particle diameter deviates from this range, namely if it is either less than 10 nm or exceeds 400 nm, it will become difficult to set the surface roughness $(Ra)_B$ of the backcoat layer in the range of 10 to 30 nm.

The paint for the formation of the backcoat layer, when necessary for the purpose of enhancing the mechanical strength thereof, may incorporate therein the same abrasive materials and nonmagnetic inorganic powders as used in the magnetic layer mentioned above besides carbon black. The average particle diameter of the nonmagnetic inorganic powder properly is in the range of 0.1 to 0.5 μm. If this magnitude is less than 0.1 μm or exceeds 0.5 μm, it will become difficult to set the surface roughness $(Ra)_B$ of the backcoat layer in the range of 10 to 30 nm. The content of the nonmagnetic inorganic powder is properly in the range of 0.1 to 5 parts by weight, preferably 0.2 to 2 parts by weight, based on 100 parts by weight of carbon black.

The binder, cross-linking agent, organic solvent, etc. which are used in the paint for the formation of the backcoat layer may be the same as those used in the magnetic layer mentioned above. The content of the binder is properly in the range of 15 to 200 parts by weight, preferably 50 to 180 parts by weight, based on 100 parts by weight of the total of solids. The content of the cross-linking agent is properly in the range of 10 to 40 parts by weight, based on 100 parts by weight of the binder. The amount of the organic solvent to be added is properly required to be in the approximate range of 300 to 1200 parts by weight, based on 100 parts by weight of the total of the solids and the binder.

The paint for the formation of the backcoat layer, when necessary, may incorporate therein a lubricant such as fatty acid or a fatty acid ester, a dispersant, and other various additives.

The paint for the formation of the backcoat layer is prepared, similarly to the paint for the magnetic layer, by adopting any of the known methods. The thickness of the backcoat layer which is obtained by applying the paint for the formation of the backcoat layer to the support is fixed in the range of 0.2 to 1.0 μm.

(EXAMPLES)

Now, this invention will be described more specifically below with reference to concrete working examples.

The magnetic paint for the formation of the magnetic layer and the paint for the formation of the backcoat layer were manufactured as follows.

Preparation of magnetic paint

The magnetic paint for the formation of the magnetic layer was manufactured by thoroughly kneading the following components in a pressure kneader, dispersing the resultant blend by using a sand-grind-mill, diluting the dispersion with an organic solvent, and adding 4 parts by weight of polyisocyanate (produced by Nippon Poriuretan and marketed under trademark designation of "Coronate L").

| | |
|---|---|
| Co-containing $\gamma$-Fe$_2$O$_3$ (specific surface area (BET value) 35.0 m$^2$/g) | 100 parts by weight |
| Vinyl chloride-based resin (produced by Nippon Zeon and marketed under product code of "MR-110") | 12 parts by weight |
| Polyurethane-based resin (produced by Nippon Poriuretan Kogyo and marketed under product code of "N-2304") | 8 parts by weight |
| Carbon black | 3 parts by weight |
| $\alpha$-Al$_2$O$_3$ (produced by Sumitomo Chemical and marketed under product code of "HIT-50") | 3 parts by weight |
| Cr$_2$O$_3$ (produced by Nippon Chemical Industrial and marketed under product code of "S-1") | 2 parts by weight |
| Fatty acid | 1.2 parts by weight |
| Fatty acid ester | 0.5 part by weight |
| Methylethyl ketone | 100 parts by weight |
| Methylisobutyl ketone | 20 parts by weight |
| Toluene | 100 parts by weight |
| Cyclohexanone | 50 parts by weight |

Preparation of paint for formation of backcoat layer

The paint for the formation of the backcoat layer was manufactured by thoroughly kneading the following components in a pressure kneader, dispersing the resultant blend by using a sand-grind-mill, diluting the dispersion with an organic solvent, and adding 15 parts by weight of polyisocyanate (produced by Nippon Poriuretan and marketed under trademark designation of "Coronate L").

| | |
|---|---|
| Carbon black (produced Mitsubishi Chemical and marketed under product code of "#47B") | 100 parts by weight |
| Carbon black (produced by Columbian Chemicals and marketed under under trademark designation of "Sevacarb MT-CI") | 1 part by weight |
| Vinyl chloride-based resin | 50 parts by weight |
| Polyurethane-based resin (produced by Nippon Poriuretan Kogyo and marketed under product code of "N-2304") | 50 parts by weight |
| $\alpha$-Fe$_2$O$_3$ (produced by Toda Kogyo and marketed under product code of "TF-100") | 1 part by weight |
| Fatty acid | 3 parts by weight |
| Fatty acid ester | 1 part by weight |
| Methylethyl ketone | 550 parts by weight |
| Methylisobutyl ketone | 150 parts by weight |
| Toluene | 600 parts by weight |
| Cyclohexanone | 200 parts by weight |

Preparation of sample magnetic recording medium

As illustrated in FIG. 2, the magnetic paint was discharged through the extrusion nozzle 20 on one of the opposite surfaces of the polyethylene terephthalate (PET) support, 13.1 μm in thickness, in continuous motion to form continuously an applied film for the magnetic layer and, at the same time, the paint for the formation of the backcoat layer was discharged through the extrusion nozzle 30 on the other surface of the support to form continuously an applied film for the backcoat layer. Then, the magnetic layer and the backcoat layer were predried severally by the hot air blowing nozzles 53 and, while the magnetic layer was not yet dried, were passed through the orienting magnets 41, 41 to orient the magnetic powder in the running direction (by application of an orienting field of 4000 G in the running direction of the magnetic recording medium) and meanwhile dry the applied films to complete the magnetic layer and the backcoat layer. Then, the surfaces of the two layers were calendered and the support now bearing the dried applied films was wound up provisionally and subjected to a thermally curing treatment at 70° C. for 24 hours. Thereafter, the support was slit (speed: 400 m/min. tension: 200 g/½ inch) into tapes, ½ inch in width, and the surface of the backcoat layer in each of the tapes was polished with the lapping tape to produce magnetic recording media. The thickness of the magnetic layer was 2.0 µm and that of the backcoat layer was 0.5 µm.

In the production of the magnetic recording medium by the procedure described above, backcoat layers having varied values of surface roughness $(Ra)_B$ and lapping tapes having varied values of surface roughness $(Ra)_L$ of abrasive layer were prepared as described in the following working examples. Then various samples of magnetic recording medium were produced by variously combining the backcoat layers and the lapping tapes for the purpose of the polishing treatment performed on the surface of the backcoat layer.

(Example 1)

A magnetic recording medium whose backcoat layer had surface roughness $(Ra)_B$ of 20 nm before the polishing treatment was subjected to the polishing treatment twice continuously in the manner shown in FIG. 4 by the use of a lapping tape whose abrasive layer had surface roughness $(Ra)_L$ of 300 nm. After the polishing treatment, the magnetic recording medium was given a wiping treatment to obtain the sample of magnetic recording medium of Example 1.

The polishing treatment was carried out during the course of the slitting step. The abrasive layer of the lapping tape used ground $\alpha$-$Al_2O_3$ (Mohs hardness: 9.0) for abrasive grains thereof. The thickness of the abrasive layer was 5 µm. The flexible support for basing the abrasive layer was made of a polyethylene terephthalate (PET) film, 25 µm in thickness. The supporting pin used in the polishing treatment had a diameter of 2 mm. The angles of contact ($\theta_L$ and $\theta_B$) of the lapping tape and the magnetic recording medium with the supporting pin were 60° and 30°, respectively. The running direction of the lapping tape was the reciprocal of that of the magnetic recording medium. The speed of the lapping tape was 58 mm/min and the tension thereof was 60 g/(½ inch). The wiping of the magnetic recording medium after the polishing treatment was made with the product of Toray marketed under trademark designation of "Mirakureeshon Tape #52002TR"). In the present example, the polishing treatment of the magnetic layer was performed simultaneously with the polishing treatment of the backcoat layer in one and the same line. The polishing treatment of the magnetic layer was carried out at a position different from the position for the polishing treatment of the backcoat layer and it was additionally performed in front of the position for the winding operation. The conditions of the polishing treatment were the same for both the backcoat layer and the magnetic layer.

(Examples 2 and 3)

The samples of the Examples 2 and 3 were produced by following the procedure of Example 1 while changing the surface roughness $(Ra)_L$ of the abrasive layer respectively to 150 nm and 550 nm.

(Examples 4 through 6)

The samples of Examples 4 through 6 were produced by following the procedure of Example 1 while changing the surface roughness $(Ra)_B$ of the backcoat layer invariably to 10 nm and the surface roughness $(Ra)_L$ of the abrasive layer respectively to 150 nm, 300 nm, and 550 nm.

(Examples 7 through 9)

The samples of Examples 7 through 9 were produced by following the procedure of Example 1 while changing the surface roughness $(Ra)_B$ of the backcoat layer invariably to 30 nm and the surface roughness $(Ra)_L$ of the abrasive layer respectively to 150 nm, 300 nm, and 550 nm.

(Examples 10 and 11)

The samples of Examples 10 and 11 were produced by following the procedure of Example 1 while changing the surface roughness $(Ra)_B$ of the backcoat layer respectively to 25 nm and 13 nm and the surface roughness $(Ra)_L$ of the abrasive layer invariably to 500 nm.

(Examples 12 and 13)

The samples of Examples 12 and 13 were produced by following the procedure of Example 1 while changing the surface roughness $(Ra)_B$ of the backcoat layer respectively to 25 nm and 13 nm and the surface roughness $(Ra)_L$ of the abrasive layer invariably to 250 nm.

(Examples 14 and 15)

The samples of Example 14 and 15 were produced by following the procedure of Example 1 while changing the abrasive grains of the abrasive layer from $\alpha$-$Al_2O_3$ respectively to SiC (Mohs hardness: 9.5, Example 14) and $Cr_2O_3$ (Mohs hardness: 9.0, Example 15).

(Examples 16 through 19)

The samples of Examples 16 through 19 were produced by following the procedure of Example 1 while changing the conditions for the thermally curing treatment during the production of the sample of magnetic recording medium from 70° C. and 24 hours to 70° C. and 12 hours (Example 16), 70° C. and 48 hours (Example 17), 50° C. and 24 hours (Example 18), and 80° C. and 24 hours (Example 19).

(Example 20)

The sample of Example 20 was produced by following the procedure of Example 1 while omitting the wiping treatment subsequent to the polishing treatment.

(Examples 21 and 22)

The samples of Examples 21 and 22 were produced by following the procedure of Example 1 while first giving the magnetic layer the polishing treatment and winding it provisionally and then giving the backcoat layer the polishing treatment (Example 21) and first giving the backcoat layer the polishing treatment and winding it provisionally and then giving the magnetic layer the polishing treatment (Example 22) instead of simultaneously giving the magnetic layer and the backcoat layer the polishing treatment in one and the same lime.

(Example 23)

The sample of Example 23 was produced by following the procedure of Example 1 while giving the polishing treatment only to the backcoat layer.

(Comparative Examples 1 through 3)

The samples of Comparative Examples 1 through 3 were produced by following the procedure of Example 1 while changing the surface roughness $(Ra)_B$ of the backcoat layer invariably to 8 nm and the surface roughness $(Ra)_L$ of the abrasive layer respectively to 100 nm, 300 nm, and 600 nm.

(Comparative Examples 4 and 5)

The samples of Comparative Examples 4 and 5 were produced by following the procedure of Example 1 while changing the surface roughness $(Ra)_B$ of the backcoat layer invariably to 20 nm and the surface roughness $(Ra)_L$ of the abrasive layer respectively to 100 nm and 600 nm.

(Comparative Examples 6 through 8)

The samples of Comparative Examples 6 through 8 were produced by following the procedure of Example 1 while changing the surface roughness $(Ra)_B$ of the backcoat layer invariably to 33 nm and the surface roughness $(Ra)_L$ of the abrasive layer respectively to 100 nm, 300 nm, and 600 nm.

(Comparative Example 9)

The sample of Comparative Example 9 was obtained by following the procedure of Example 1 while omitting the polishing treatment.

(Comparative Example 10)

The sample of Comparative Example 10 was produced by following the procedure of Example 1 while changing the abrasive grains of the abrasive layer from $\alpha\text{-}Al_2O_3$ to $\alpha\text{-}Fe_2O_3$ (Mohs hardness: 5.5).

(Comparative Example 11)

The sample of Comparative Example 11 was produced by following the procedure of Example 1 while omitting the thermally curing treatment (70° C. and 24 hours) during the production of the sample of magnetic recording medium.

(Comparative Examples 12 through 14)

The samples of Comparative Examples 12 through 14 were produced by following the procedure of Example 1 while changing the conditions for the thermally curing treatment during the production of the sample of magnetic recording medium from 70° C. and 24 hours to 70° C. and 6 hours (Comparative Example 12), 35° C. and 24 hours (Comparative Example 13), and 90° C. and 24 hours (Comparative Example 14).

The surface roughness $(Ra)_B$ of the backcoat layer and the surface roughness $(Ra)_L$ of the abrasive layer were determined as follows.

Surface roughness $(Ra)_B$ and $(Ra)_L$

Measuring instrument: The product of Taylor Hobson marketed under trademark designation of "TALYSTEP Shisutemu"

Method of determination: Method specified in JIS B-0601
Conditions of determination:
Filtering conditions: 0.18–9 Hz
Stylus: 0.1×2.5 μm special stylus
Stylus pressure: 2 mg
Measuring speed: 0.03 mm/sec
Measuring length: 500 μm Each of the samples (Samples of Examples 1 through 23 and Samples of Comparative Examples 1 through 14) was tested for "occurrence of scratch on the surface of the backcoat layer", "DO (dropout)", "instantaneous clogging", "torque against POM guide", and "endurance friction coefficient".

The methods of these determinations were as follows.
Occurrence of scratch on the surface of backcoat layer The surface of the backcoat layer of the magnetic recording medium after the polishing treatment was visually observed over the length of 2 m to take count of scratches. The seriousness of surface damage was rated on the following four-point scale.

◎... Number of scratches 0–1
○... Number of scratches 2–5
Δ... Number of scratches 6–10
X... Number of scratches Not less than 10

DO (dropout)

Measuring instruments: VTR produced by Japan Victor Corporation and marketed under product code of "BR-7000A" and dropout counter produced by Shibasoku and marketed under product code of "VH01BZ"

Conditions of determination:
Input signal: 50% white signal
Width: 15 μsec
Depth: 16 dB
Measuring time: 160 min The sample was tested for number of dropouts per minute by the use of the measuring instrument mentioned above under the conditions mentioned above.

Instantaneous clogging

Measuring instruments: VTR produced by Matsushita Electric Industrial and marketed under product code of "NV-FS800" and recorder produced by Yokokawa Electric Works and marketed under product code of "TYPE-3057"

Conditions of determination:
Amount of projection of head: 10 μm
Head cleaning mechanism: None Method of determination: Ten rolls of each of the magnetic recording media (160-minute video tape) of the working examples and the comparative examples were prepared. Images were recorded and regenerated continuously on the first through tenth rolls, with the variations of RF output during the regeneration recorded on the recorder. The numbers of drops of RF output (a drop of less than −3.0 dB within 15 seconds relative to the initial output taken as an instantaneous clogging) were found on the first through tenth rolls and were rated on the following four-point scale.

◎... Number of instantaneous cloggings None
○... Number of instantaneous cloggings 1–5
Δ... Number of instantaneous cloggings 6–10
X... Number of instantaneous cloggings 11 or over or clogging (drop of RF output for a duration of not less than 15 seconds or no-return drop of RF output)

Torque against POM guide

Measuring instruments: VTR produced by Japan Victor Corporation and marketed under product code of "BR-S605S", DC power source produced by Kikusui Electronics and marketed under product code of "PAB18-1A", and torque gauge produced by Tohnichi Seisakusho.

Conditions of determination:
Video tape cassette: Type provided with resinous tape guide of polyacetal (POM)
Tape length: 330 m (160-minutes video tape)
Part used for torque measurement: The REW (static) torque was measured at the point of the tape reached after feeding the tape on the regeneration mode from the head for one minute on the VTR Method of determination: The REW torque could be varied by varying the voltage of the REW motor of the VTR by means of the DC power source. The minimum torque exhibited by each of the samples of the working examples and the comparative examples cited above when the sample was completely rewound by varying the REW torque under the conditions of determination mentioned above was reported as the torque against the POM guide. Generally, the frequency of occurrence of the stop of the run of the sample on the VTR rises when the torque exceeds 260 $f_f$·cm.

Endurance friction coefficient

Measuring instrument: The product of Shimadagiken marketed under trademark designation of "Shushain Sokuteiki"

Conditions of determination:

Running speed of tape: 1.11 cm/sec

Winding angle of running surface: 180°

Number of repeated runs: 100

The endurance friction coefficient ($\mu$) is calculated by the formula, $(\mu)=(1/\theta) \log (X/X_0)$, wherein stands for $\theta=\pi(\text{rad})$, $X_0$ for load 40 (g), and X for the value found after 100 runs. Generally, the frequency of occurrence of rejectable run on the VTR increases when the endurance friction coefficient exceeds 0.20.

The results of the evaluations mentioned above are shown in Table 1 below.

The effect of this invention is evident from the results given above. To be specific, this invention is directed to a method which comprises applying a magnetic paint for the formation of a magnetic layer and a paint for the formation of a backcoat layer severally to the opposite surfaces of a nonmagnetic support, drying the applied films, optionally calendering the dried films, giving the backcoat layer a curing treatment thereby adjusting the surface roughness $(Ra)_B$ thereof in the range of 10 nm to 30 nm, and thereafter subjecting the surface of the backcoat layer subsequent to the curing treatment to a polishing treatment using a lapping tape whose abrasive layer has surface roughness $(Ra)_L$ in the range of 150 nm to 550 nm. In a preferred embodiment of this invention, the Mohs hardness of the abrasive grains contained in the abrasive layer is set within a prescribed range and the conditions of the curing treatment are fixed within prescribed ranges. As a result, the magnetic recording medium consequently produced never suffers the surface of a backcoat layer to sustain a scratch, provides thorough protection against the occurrence of instantaneous clogging and DO, and exhibits a veritably excellent running property (evinced particularly by the realization of the low torque against the ROM guide).

What is claimed is:

1. A method for the production of a magnetic recording medium provided on one of the opposite surfaces of a

TABLE 1

| Sample No. | $(Ra)_B$ (nm) | $(Ra)_L$ (nm) | Occurrence of scratches on the surface of BC | DO (number/minute) | Instantaneous clogging | Torque against POM guide | Endurance friction coefficient |
|---|---|---|---|---|---|---|---|
| Example 1 | 20 | 300 | ⊚ | 4 | ⊚ | 245 | 0.16 |
| Example 2 | 20 | 150 | ⊚ | 6 | ⊚ | 255 | 0.16 |
| Example 3 | 20 | 550 | ○ | 8 | ⊚ | 240 | 0.17 |
| Example 4 | 10 | 150 | ⊚ | 5 | ⊚ | 250 | 0.18 |
| Example 5 | 10 | 300 | ⊚ | 5 | ⊚ | 245 | 0.19 |
| Example 6 | 10 | 550 | ○ | 8 | ⊚ | 240 | 0.19 |
| Example 7 | 30 | 150 | ⊚ | 7 | ○ | 255 | 0.15 |
| Example 8 | 30 | 300 | ⊚ | 8 | ○ | 250 | 0.15 |
| Example 9 | 30 | 550 | ⊚ | 9 | ○ | 250 | 0.16 |
| Example 10 | 25 | 500 | ⊚ | 5 | ⊚ | 245 | 0.16 |
| Example 11 | 13 | 500 | ⊚ | 4 | ⊚ | 240 | 0.17 |
| Example 12 | 25 | 250 | ⊚ | 5 | ⊚ | 250 | 0.16 |
| Example 13 | 13 | 250 | ⊚ | 4 | ⊚ | 245 | 0.17 |
| Example 14 | 20 | 300 | ⊚ | 5 | ⊚ | 245 | 0.16 |
| Example 15 | 20 | 300 | ⊚ | 4 | ⊚ | 245 | 0.16 |
| Example 16 | 20 | 300 | ○ | 7 | ⊚ | 245 | 0.16 |
| Example 17 | 20 | 300 | ⊚ | 4 | ⊚ | 245 | 0.16 |
| Example 18 | 20 | 300 | ○ | 8 | ○ | 250 | 0.16 |
| Example 19 | 20 | 300 | ⊚ | 7 | ○ | 245 | 0.16 |
| Example 20 | 20 | 300 | ⊚ | 12 | ○ | 250 | 0.16 |
| Example 21 | 20 | 300 | ⊚ | 4 | ⊚ | 245 | 0.16 |
| Example 22 | 20 | 300 | ⊚ | 4 | ⊚ | 245 | 0.16 |
| Example 23 | 20 | 300 | ⊚ | 18 | ⊚ | 245 | 0.16 |
| Compara. 1 | 8 | 100 | △ | 14 | ○ | 260 | 0.23 |
| Compara. 2 | 8 | 300 | △ | 18 | ○ | 250 | 0.25 |
| Compara. 3 | 8 | 600 | X | 23 | △ | 240 | 0.28 |
| Compara. 4 | 20 | 100 | ⊚ | 12 | ○ | 265 | 0.16 |
| Compara. 5 | 20 | 600 | △ | 16 | △ | 245 | 0.16 |
| Compara. 6 | 33 | 100 | ⊚ | 11 | ○ | 295 | 0.14 |
| Compara. 7 | 33 | 300 | ⊚ | 15 | △ | 275 | 0.14 |
| Compara. 8 | 33 | 600 | ○ | 19 | X | 260 | 0.15 |
| Compara. 9 | 20 | — | ⊚ | 23 | X | 310 | 0.18 |
| Compara. 10 | 20 | 300 | ⊚ | 13 | △ | 270 | 0.16 |
| Compara. 11 | 20 | 300 | X | 88 | X | 260 | 0.17 |
| Compara. 12 | 20 | 300 | △ | 15 | ○ | 250 | 0.16 |
| Compara. 13 | 20 | 300 | △ | 26 | △ | 255 | 0.16 |
| Compara. 14 | 20 | 300 | ⊚ | 12 | △ | 245 | 0.16 |

$(Ra)_B$: surface roughness of the surface of backcoat layer.
$(Ra)_L$: surface roughness of the surface of abrasive layer.
BC: backcoat layer, DO: dropout, denomination of the torque against POM guide: $g_f$·cm
Compara.: Comparative Example nonmagnetic support with a magnetic layer and on the other surface thereof with a backcoat layer, which method comprises applying a magnetic paint for the formation of said magnetic layer and a paint for the formation of said backcoat layer severally to said nonmagnetic support, drying the applied layers of said paints, optionally subjecting said layers to a calendering treatment, performing a curing treatment on said layers thereby adjusting the surface of said backcoat layer to a surface roughness $(Ra)_B$ in the range of 10 nm to 30 nm, and thereafter subjecting the surface of said backcoat layer subsequent to said curing treatment to a polishing treatment by the use of a lapping tape the abrasive layer of which has a surface roughness $(Ra)_L$ in the range of 150 nm to 550 nm.

2. A method according to claim 1, wherein the abrasive grains contained in said abrasive layer have Mohs hardness of not less than 9.0.

3. A method according to claim 1, wherein said curing agent is a thermally curing treatment performed under the conditions of 50° to 80° C. and 12 to 48 hours.

4. A method according to claim 1, wherein said polishing treatment is followed by a wiping treatment to be performed on said backcoat layer.

* * * * *